United States Patent Office 2,767,109
Patented Oct. 16, 1956

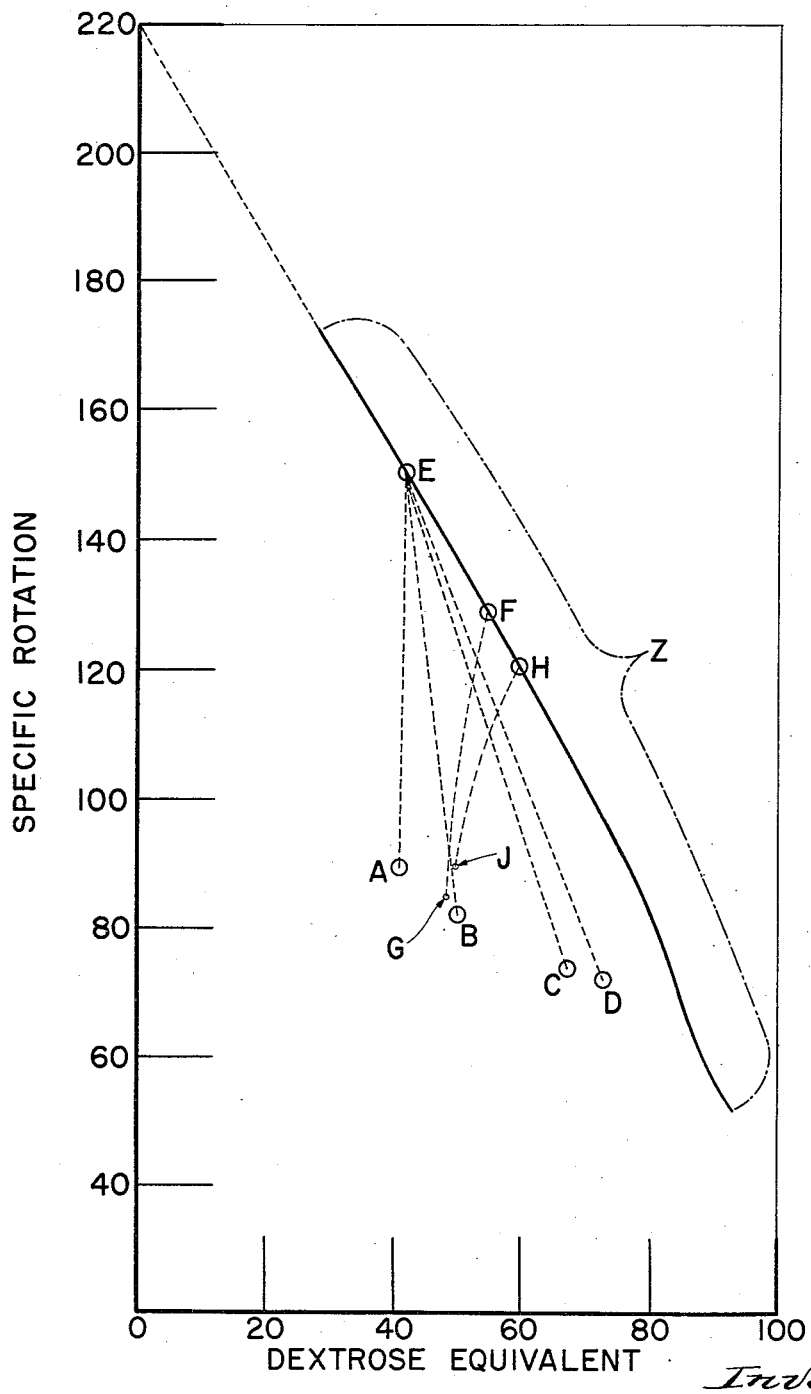

2,767,109

ACID-HEAT TREATMENT OF STARCH SYRUPS AND THE RESULTING PRODUCTS

Walter R. Fetzer, Clinton, Iowa, assignor, by mesne assignments, to Standard Brands Incorporated, New York, N. Y., a corporation of Delaware Application February 13, 1951, Serial No. 210,750

9 Claims. (Cl. 127—36)

This invention relates to new types of modified starch syrups differing in carbohydrate composition from starch syrups heretofore known in commerce.

These new syrup products are useful as ingredients of food products and for various non-food industrial processes and products. As compared to previously known starch syrups, these new products are notably different in having a substantially lower dextrin content than the previous syrups of corresponding dextrose equivalent.

At the present time three of the most widely used starch hydrolytic products of the starch industry are non-crystallizing "corn syrup," crude "corn sugar," and refined "corn sugar." As is well known, these syrups and sugars are produced from aqueous slurries of raw starch to which acid (usually hydrochloric acid) is added and to which heat is applied. The course of the hydrolysis during this acid-heat treatment is usually stated as starch to dextrin, dextrin to higher sugars, higher sugars to maltose, and maltose to dextrose, although the actual hydrolysis is probably two or more of these reactions proceeding simultaneously.

The amount or degree of the effect of this hydrolysis on the final product—or attained at any stage—is commonly and conveniently defined by the term "Dextrose Equivalent" or "D. E.," by which is meant the percentage of reducing sugars present, calculated as dextrose, and expressed as a percentage of the total dry substance in this starch hydrolytic product, or starch hydrolysate.

The commercial corn syrups commonly produced range usually in D. E. from 25 to 62, and such syrups normally do not crystallize upon standing. The specific rotation of these syrups ranges from about 178° at 25 D. E. to 115° at 62 D. E., expressed on a 100% carbohydrate basis. These corn syrups are usually marketed at densities ranging from 42° to 45° Baumé, 42° Baumé being the equivalent of about 78.3% dry substance in the product, while 45° Baumé is the equivalent of about 84.3% dry substance in the product.

Such corn syrups have a substantial dextrin content ranging from about 22% for 62 D. E. syrup to about 53% for 25 D. E. syrup as reported by the Corn Industries Research Foundation Subcommittee on carbohydrate analysis of hydrolysates in August 1941.

The crude corn sugars are commonly marketed as solids under two well known grades; i. e., "70" sugar and "80" sugar. These sugars are initially produced as billets and are either sold in that form or are chipped and bagged for sale. The "70" sugar is commonly produced from a sugar syrup of 42°–42½° Baumé, having an average solids concentration of 82% and a D. E. of between 82 and 87. "80" sugar is commonly produced from a sugar syrup of 45° Baumé, having an average solids content of 87.5%, with a D. E. of over 90.

During the acid-heat treatment to produce either the non-crystallizing corn syrups or the crystallizable corn sugar syrups, the pH of the slurry is usually held between 1.3 and 2.0 and the temperature may be in the range of 200° to 300° F., but usually in the upper part of that range to hasten the reaction. To produce the ordinary non-crystallizing corn syrups it is common practice to start with a starch slurry of about 24° Baumé (measured or calculated at 60° F.), corresponding to about 42.7% dry substance starch, which represents the highest concentration of a starch slurry that can be manipulated by customary pipes and valves. In fact, if the concentration be increased to 55%, the material becomes a doughy solid.

To produce the cord sugar syrups it is common practice to start with an aqueous starch slurry of about 9° to 18° Baumé (measured or calculated at 60° F.), corresponding to a range of 16% to 32% dry solids.

After the acid hydrolysis it is customary to neutralize, refine, and concentrate all the corn syrups and corn sugar syrups. Sugar syrup for the production of "70" sugar is usually concentrated to about 42° Baumé, seeded, and allowed to solidify in casting pans. Sugar syrup for the production of "80" sugar is usually concentrated to about 45° Baumé, seeded, and allowed to solidify in casting pans. The user of either of these solid crude sugars, heats and remelts the sugar in its own water content or in added water if he desires dilution.

Finished starch hydrolytic products ranging in D. E. from 62 to 80 are seldom found in commercial products since, if the D. E. of the product be in the lower end of that range, there will be some substantial crystallization which would render such a product unsuitable for use as a corn syrup which is supposed to remain wholly fluid and free of crystal growth. On the other hand, products whose final D. E. would lie more nearly toward 80 would be too soft for satisfactory chipping.

In general, the present invention involves treating a starch syrup, preferably a refined corn syrup having an initial D. E. between 25 and 62 and at a density between about 30° and 45° Baumé. To such a syrup I add acid of a type suitable for use in starch hydrolytic conversions, such as sulphuric or hydrochloric acids, to produce a solution having a pH within the range of about 0.5 and 2.0. This solution is then subjected to heating within a range of 200° to 300° F., and the reaction is allowed to proceed until the dextrin content has been lowered a desired amount, as indicated by the decrease in the specific rotation of the syrup. The period of acid-heat treatment may then be terminated either by cooling or by the addition of a neutralizing agent when the desired new syrup has been attained, or by other means to terminate the reaction.

As examples of a non-crystallizable syrup made in accordance with this invention, I shall describe the making of four batches:

*Example A.*—2.2 ml. of concentrated sulphuric acid (4.0 grams), diluted with an equal amount of water, was added slowly with agitation to 2 liters of 42.2 D. E., 45° Baumé corn syrup (84.3% solids). The resulting pH was 1.0. The syrup, in a flask with an air condenser, was placed in a wax bath, heated to 275° F. and the contents gently boiled at atmospheric pressure. The observed temperature was 240°–245° F. At the end of 4½ hours, the flask was removed from the bath, cooled, and the resulting light amber syrup was analyzed. The D. E. had decreased from 42.2 to 41.1 and the specific rotation, from 150.0° to 89.7°.

*Example B.*—2.8 ml. of concentrated sulphuric acid (5.2 grams), diluted with an equal amount of water, was added slowly with agitation to 2 liters of 42.2 D. E., 42° Baumé corn syrup (78.3% solids). The resulting pH was 1.0. The syrup, in a flask as above, was kept at gentle boiling at atmospheric pressure at about 242° F. for six hours, after which it was removed and the resulting syrup analyzed. The D. E. had increased from 42.2 to 49.4, and the specific rotation had decreased from 150.0° to 82.7°.

*Example C.*—4.0 ml. of concentrated sulphuric acid (7.4 grams), diluted with an equal amount of water, was added slowly with agitation, to 2 liters of 42.2 D. E., 35.0° Baumé corn syrup (64.8% solids). The resulting pH was 1.0. The syrup, in a flask as above, was kept at gentle boiling at atmospheric pressure at about 235° F. for six hours, after which it was removed and the resulting syrup analyzed. The D. E. had increased from 42.2 to 67.2, and the specific rotation had decreased from 150.0° to 73.3°.

*Example D.*—5.0 ml. of concentrated sulphuric acid (9.2 grams), diluted with an equal amount of water, was added slowly with agitation, to 3 liters of 42.2 D. E., 30.0° Baumé corn syrup (55.5% solids). The resulting pH was 1.0. The syrup, in a flask with an air condenser, was placed in a wax bath, heated to 275° F., and the contents gently boiled for seven hours at atmospheric pressure. The observed temperature of the syrup was 230° F. At the end of seven hours, the flask was removed from the bath, cooled, and the resulting syrup analyzed. This syrup, like those produced in the other examples, was a light amber. The D. E. had increased from 42.2 D. E. to 72.1 D. E., and the specific rotation had decreased from 150.0° to 72.5°.

In the four examples given, the final products, as shown by the relation between the D. E. and specific rotation of each, represent new carbohydrate compositions not hitherto produced.

The products in the four examples given are nearly equilibrated products; that is, they have been acid-heat treated until there was no further significant change in specific rotation and D. E. The acid-heat treatment could have been stopped at some intermediate point, thereby obtaining a syrup with a different carbohydrate composition. Likewise, the initial corn syrup used could have had a higher or lower D. E., resulting in a different course of carbohydrate alteration to reach the equilibrated state, for I have found that the effect of the acid-heat treatment is largely dependent upon the carbohydrate solids concentration of the syrup undergoing the treatment.

It will be noted that in some of the examples the D. E. has been increased and in others, decreased. In all cases, however, the specific rotation was lowered, as will always occur when this process is practiced in accordance with this invention. The lowering of the specific rotation is primarily due to the decrease of dextrin content. It is believed that the dextrin is hydrolyzed to higher sugars which, in accordance with generally accepted theories, have lower specific rotation and higher sweetness than dextrin. The lowering of the specific rotation even to the limited extent of 5 or 10 degrees evidences a substantial and notable change in the dextrin content and the sugars content. For the numerous and varied uses to which these modified syrups may be put, such changes are significant.

Numerous new syrups may be produced in accordance with this invention, dependent upon such factors as the composition and carbohydrate concentration of the initial syrup and the point at which the reaction is stopped, if it be stopped short of its equilibrium point. The pH and temperature treatment within the heretofore stated ranges, affect primarily the rate of reaction.

To make this more clear, in the accompanying drawing the single figure is a graph in which specific rotation on a carbohydrate basis is plotted as the ordinate, and D. E. (dextrose equivalent) is plotted as the abscissa. The solid line portion of curve Z is derived from the analysis of products made according to standard practices in the starch industry and represents the specific rotation and D. E. relationship of various starch hydrolysates such as corn syrups, crude corn sugar syrups, and corn sugar syrups destined for production of crystalline dextrose. All of these are produced by the acid hydrolysis of starch slurries. Commercial corn syrup is identified on the curve Z as those hydrolysates whose D. E. lies between 25 and 62. Hydrolysates produced for use as "70" or "80" sugars are identified on the curve as having a D. E. between 80 and 92. For crystalline dextrose production, the hydrolysates commonly have a D. E. above 90. It is not contended that this curve is absolutely accurate but is sufficiently accurate for present reference purposes.

Point E on curve Z identifies the starting material used in Examples A, B, C, and D, while the points A, B, C, and D to the left of the curve are the points at which the procedures of the Examples A to D terminated, and which points are approaching equilibrium. In each case these points lie to the left of curve Z, as will be true, as I have discovered, of any point arrived at by processing, in accordance with this invention, any starch hydrolysate, or corn syrup, identifiable by a corresponding point therefor lying on curve Z between 25 and 62 D. E. for which the corresponding specific rotations of these end points are about 178 and about 116. In addition to the fact that the starting material must be within 25 and 62 D. E., it must also have a density between 30° and 45° Baumé, preferably, but this range may also be extended to 28° to 47° Baumé. Starting materials of any D. E. within this above stated range but having different density within the above stated range, will react differently when treated in accordance with this invention, but in every case a curve plotting the carbohydrate composition change during the reaction will lie to the left of curve Z.

F and H represent such other hydrolysates taken as starting materials, and G and J the points short of equilibrium at which the treatment of those two hydrolysates, respectively, terminated. Both of these starting materials had initially a density of about 43 Baumé.

On this graph a curve can be drawn representing the successive changes in carbohydrate composition, as measured by D. E. and specific rotation, during the course of treatment, in accordance with this invention, of any corn syrup identifiable on curve Z whose D. E. lies between 25 and 62, when the reaction is allowed to run toward equilibrium. Each such curve will start on curve Z and run downwardly and to the left of curve Z.

The portion of curve Z between 25 and 62 D. E. is essentially a straight line which can be defined by the following equation:

$$\frac{220-[\alpha]_D^{20}}{\text{D. E.}}=1.7 \text{ (approx.)}$$

Now, considering any modified syrup made in accordance with this invention, when its specific rotation and D. E. have been ascertained by analysis and these figures have been substituted in the left hand member of the above equation, the right hand member of the equation will be a number greater than 1.7.

The temperatures employed in my examples have been those of the boiling points at atmospheric pressure of the syrup undergoing acid-heat treatment. Increasing the temperature decreases the time necessary to obtain a desired product. It is apparent that this reaction could be carried out in pressure vessels at temperatures above those given for atmospheric boiling, or below those given if a longer time is available. Therefore, I do not claim specific temperature for my acid and heat treatment, but rather a range of temperatures—200° to 300° F.—depending upon the equipment available and the use of such equipment in factory production schedules.

It is also understood that although I have used sulphuric acid to reduce the pH, other acids such for example as hydrochloric can be used. Also, the pH given in the examples is not critical, for pH's as low as 0.5 and as high as 2.0 have been used and with success. The rate of reaction for the acid-heat treatment is increased as the pH is decreased. Above pH 2.0 the rate would be materially decreased and the time for the reaction unduly extended.

The finished syrup products from the acid-heat treatment may be used as is, ion-exchanged, or neutralized to pH 4.0 to 5.0. For the latter purpose, sodium carbonate, sodium hydroxide, sodium sulfite, and other alkalis and alkaline earths may be used, either singly or in combination.

It should be understood that this invention is susceptible of considerable variation and modification without departure from the scope of the invention as disclosed herein and defined in the claims appended hereto.

I claim:

1. The process comprising subjecting a non-crystallizing starch hydrolysate, having a D. E. between 25 and 62, and having a dextrin content within the range of 53 to 22%, to heat and acid treatment at a pH between 0.5 and 2.0, at a temperature between 200° and 300° F. and at a density between 28° and 47° Bé., and continuing the treatment until the specific rotation thereof has been lowered at least five degrees.

2. The process comprising subjecting a non-crystallizing corn syrup having a specific rotation above 116° to heat and acid treatment at a pH between 0.5 and 2.0, at a temperature between 200° and 300° F. and at a density between 28° and 47° Bé. until the specific rotation has decreased at least 5° but not to a point lower than 65°.

3. The process comprising treating a non-crystallizing starch hydrolysate whose D. E. is between 25 and 62 and whose specific rotation and D. E. when substituted in the term $$\frac{220-[\alpha]_D^{20}}{D.\ E.}$$

yields a quotient of substantially 1.7 comprising subjecting the hydrolysate to acid-heat treatment within a pH range of 0.5 to 2.0 and at a temperature between 200° and 300° F. while at a density between 28° and 47° Baumé whereby the specific rotation is lowered at least 5° and the D. E. and the altered specific rotation when applied to the above term, yields a quotient substantially greater than 1.7.

4. The process comprising subjecting a refined non-crystallizing corn syrup, having a D. E. between 25 and 62 and having a dextrin content between 53 and 22% to acid and heat treatment at a pH between 0.5 and 2.0, at a temperature between 200° and 300° F. and at a density between 28° and 47° Bé., and continuing the treatment until the specific rotation thereof has been lowered at least 5° but not to a point lower than 65°.

5. The process of producing a stable non-crystallizing starch syrup having a final D. E. substantially above 62 comprising subjecting a starch hydrolysate whose D. E. is between 25 and 62 and whose density is between 28° and 35° Bé. to acid heat treatment at a pH between 0.5 and 2.0 and at a temperature between 200° and 300° F. until the specific rotation of the hydrolysate has decreased more than 5° and the D. E. has increased to substantially above 62°.

6. The process of producing a stable non-crystallizing starch syrup having a final D. E. substantially above 62 comprising subjecting a starch hydrolysate whose D. E. is between 25 and 62 and whose density is between 28° and 35° Bé. to acid heat treatment at a pH between 0.5 and 2.0 and at a temperature between 200° and 300° F., continuing the treatment until the D. E. of the solution has increased above 70 D. E. and terminating the chemical reaction short of its equilibrium point by neutralizing the solution to a 4.0 to 5.0 of pH range.

7. A non-crystallizing syrup produced in accordance with the method of claim 1.

8. A non-crystallizing syrup produced in accordance with the method of claim 3.

9. A non-crystallizing sugar syrup produced in accordance with the method of claim 6.

References Cited in the file of this patent

UNITED STATES PATENTS

| | | |
|---|---|---|
| 1,556,854 | Lenders | Oct. 13, 1925 |
| 1,668,308 | Ebert | May 1, 1928 |
| 1,704,037 | Ebert | Mar. 5, 1929 |
| 1,876,883 | Ebert | Sept. 13, 1932 |
| 2,582,261 | Longenecker | Jan. 15, 1952 |
| 2,610,930 | Cleland | Sept. 16, 1952 |

OTHER REFERENCES

Evans et al.: Dextrins from Corn Syrup, Ind. and Eng. Chem., April 1943, pages 439–441.

Radley: Starch and Its Derivatives, 2nd ed., New York, 1944, pages 213–217.